US006923486B1

(12) United States Patent
Slagman

(10) Patent No.: US 6,923,486 B1
(45) Date of Patent: Aug. 2, 2005

(54) GRIPPER FOR LIFTING A STACK

(75) Inventor: Freerk Dirk Slagman, Veenendaal (NL)

(73) Assignee: FPS Food Processing Systems B.V., Nootdorp (NL)

( * ) Notice: Subject to any disclaimer, the term of this patent is extended or adjusted under 35 U.S.C. 154(b) by 0 days.

(21) Appl. No.: 10/110,727

(22) PCT Filed: Oct. 12, 2000

(86) PCT No.: PCT/NL00/00732

§ 371 (c)(1),
(2), (4) Date: Aug. 16, 2002

(87) PCT Pub. No.: WO01/26971

PCT Pub. Date: Apr. 19, 2001

(30) Foreign Application Priority Data

Oct. 13, 1999 (NL) .................................... 1013281

(51) Int. Cl.[7] ........................... B66C 1/32; B65B 35/36
(52) U.S. Cl. ...................................... 294/115; 294/106
(58) Field of Search ............................ 294/67.31, 106, 294/115, 81.51; 414/792.9, 796.9, 799, 729, 414/739

(56) References Cited

U.S. PATENT DOCUMENTS 2,743,954 A * 5/1956 Ostlund ...................... 294/115
3,001,812 A * 9/1961 Anderson ................. 294/67.31
3,429,459 A * 2/1969 Paul et al. ................... 414/794
3,549,192 A * 12/1970 Cassady ...................... 294/106
4,701,091 A * 10/1987 Yamauchi et al. ......... 414/792.8
5,141,274 A * 8/1992 Hayden et al. .............. 294/113
5,338,150 A * 8/1994 Focke et al. ................. 294/115
6,135,704 A * 10/2000 Seaberg .................... 294/119.1
6,237,978 B1 * 5/2001 Bliss .......................... 294/106

FOREIGN PATENT DOCUMENTS

| DE | 3540121 | * | 5/1987 |
| EP | 0482406 | * | 4/1992 |
| EP | 1 285 870 | | 2/2003 |
| GB | 2017035 | * | 9/1979 |
| NL | 300734 | * | 9/1965 |

* cited by examiner

Primary Examiner—Eileen D. Lillis
Assistant Examiner—Paul T. Chin
(74) Attorney, Agent, or Firm—Stites & Harbison PLLC; Marvin Petry

(57) ABSTRACT

A gripper for lifting a stack (30) of boxes, trays or such substantially rectangular articles, the gripper being provided with a gripper frame (11, 12; 51, 52) and two flat gripper leaves (21) which are movably connected to the gripper frame (11, 12; 51, 52) so as to be movable from an open position to a closed position, the gripper leaves (21) being substantially flat and each being provided near a lower end thereof with a carry strip (20, 22), which carrying strip (20, 22) is hingedly connected to the gripper leaves (21) so as to be movable from a release position in which the carrying strip (20, 22) extends in the same plane as the associated gripper leaf (21) to a carrying position in which the carrying strip (20, 22) is substantially perpendicular to the gripper leaf (21) and is located between both griper leaves (21), the gripper being provided with control means (14–19, 23) for controlling the gripper leaves (21) and the carrying strips (20, 22).

4 Claims, 3 Drawing Sheets

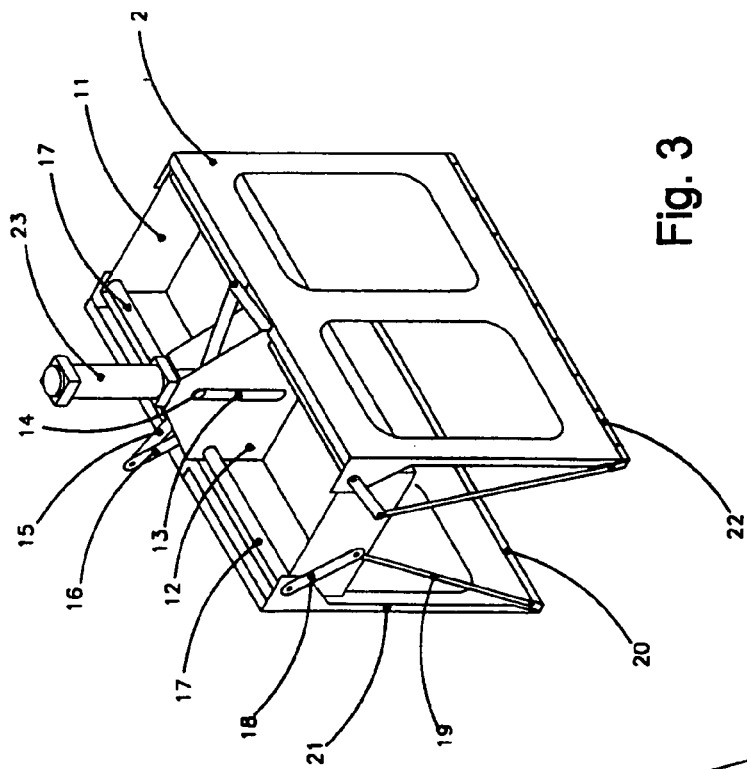
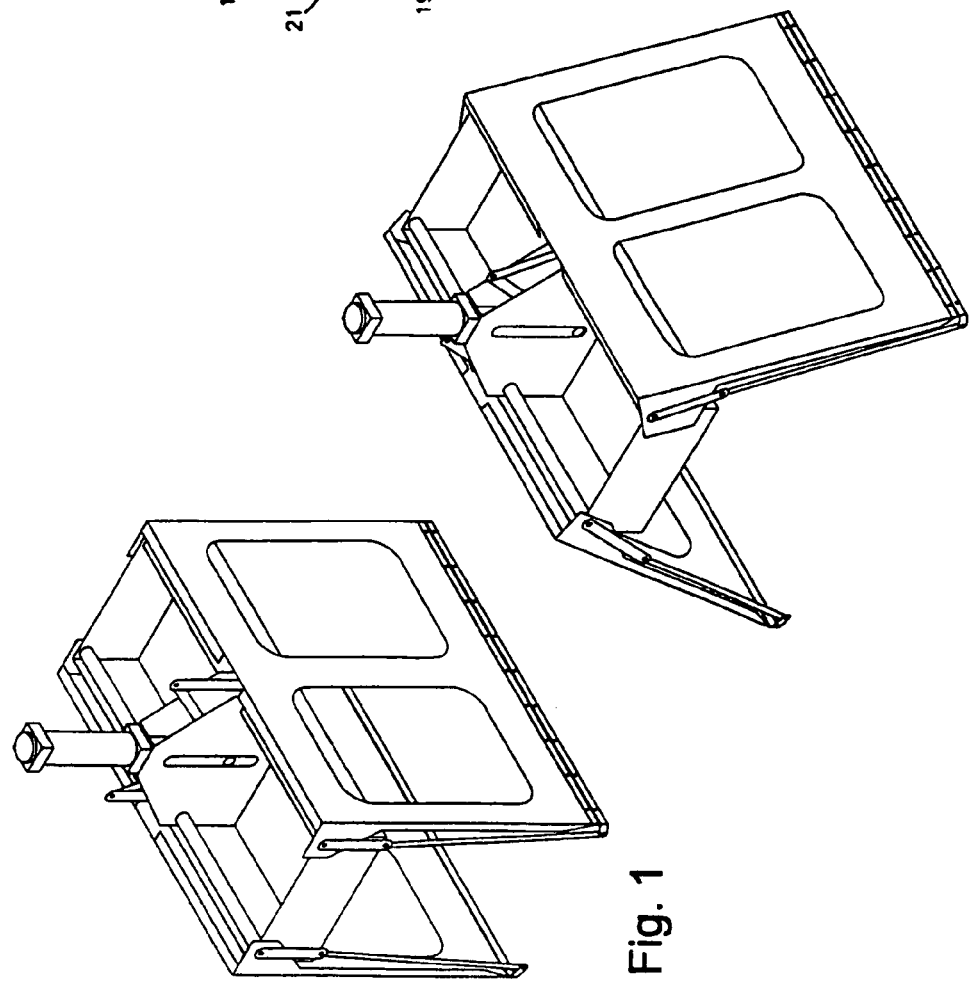

GRIPPER FOR LIFTING A STACK

The invention relates to a gripper for lifting a stack of boxes, trays or such substantially rectangular articles, the gripper being provided with a gripper frame and two gripper leaves which are movably connected to the gripper frame so as to be movable from an open position to a closed position, the gripper leaves each being provided near a lower end thereof with a carrying strip, which carrying strip is hingedly connected to the gripper leaves so as to be movable from a release position in which the carrying strip extends in the same plane as the associated gripper leaf to a carrying position in which the carrying strip is substantially perpendicular to the gripper leaf and is located between both gripper leaves, the gripper being provided with control means for controlling the gripper leaves and the carrying strips, the gripper leaves being hingedly connected to the gripper frame by an upper end.

BACKGROUND OF THE INVENTION

Such a gripper is known from EP-A-0 482 406. In the known gripper the control means for controlling the carrying strips are formed by two piston/cylinder-assemblies 63 which are connected to the carrying strips via operating plates 33, 34 which operating strips are hingedly connected to the carrying strips. The control means for controlling the movement of the gripper leaves is performed by two piston/cylinder-assemblies 56, 57. As is clear from FIG. 5 of EP-A-0 482 406, the operating plates 33, 44 are positioned between the article and the gripper leaves. In view of the fact that the gripper leaves have to absorb the forces which are exerted by the operating plates on the carrying strips, the gripper leaves have to be strong and, consequently, the gripper leaves are rather thick, especially, in the upper region where the moment of force exerted by the piston cylinder-assemblies 56, 57 is large. Due to the interposition of the operating plates between the box to be carried and the gripper leaves and due to the thickness of the gripper leaves, there must be left space around the box which is handled by that gripper. It should be noted that the known gripper is not especially intended for placing objects in overpack boxes. The known gripper is intended for placing boxes on pallets.

A gripper for placing egg boxes in overpack boxes in which the egg boxes are fittingly received is known from, for instance, European patent application EP-A-0 666 149. The gripper leaves are therefore of slender design so that they can move through the narrow space between an egg box and the relevant overpack box. The known gripper is particularly intended for lifting egg boxes which themselves have a certain rigidity. Egg trays are considerably weaker and therefore need more support. Moreover, the known gripper is intended for gripping one or a number of egg boxes which are at the same level. The known gripper is explicitly not suitable for gripping a stack of egg trays.

The filling of overpack boxes with stacks of egg trays has hitherto been done manually. The trays are stacked up by rotating them alternately through 90 degrees. In general, a person lifts two stacked trays manually and places the trays on the bottom of an overpack box. Subsequently, this operation is repeated two times for an overpack box in which one stack is contained and five times for an overpack box in which two stacks are contained. This packaging process requires a number of difficult repeating movements, which are not only monotonous to the packaging personnel, but which can also lead to overburdening injuries in the forearm, wrist and/or hand. The gripper according to the present invention has for its object to automatize this process, so that by one single movement one or two stacks of trays can be placed in an overpack box.

SUMMARY OF THE INVENTION

The invention therefore has for its object to improve a gripper of the type described in the opening paragraph, such that it can also handle articles weaker than boxes, such as for instance egg trays, in which connection in particular the handling of a stack of egg trays should be within the range of possibilities.

To this end, the gripper of the type described in the opening paragraph is characterized according to the invention in that the gripper leaves are substantially flat and that the control means comprise four first rod strips which are rotatably connected to the free ends of the carrying strips by a first end and to driving means by another free end, the rod strips, in a closed position of the gripper leaves and in the carrying position of the carrying strips, extending from the carrying strips in the direction of an imaginary line which extends parallel to the gripper leaves and is located centrally above a stack of articles to be lifted by the gripper so that when carrying a stack of articles the rod strips are tension loaded.

By means of such a gripper a stack of trays can be lifted safely because the carrying strips of the gripper extend below the lowermost tray of the stack. The lowermost tray is therefore supported on the carrying strip and is hardly, if at all, loaded in the transverse direction. The gripper leaves hardly, if at all, pinch. The risk of cracking or bending of the trays is thereby reduced to a minimum. Because during carrying the rod strips are tension loaded, they can be of very slender design, which is important to enable placing of a stack of trays in a close-fitting overpack box. For the purpose of bringing the carrying strips into the release position and the gripper leaves into the open position, the rod strips are pressure loaded by the driving means.

The above driving means for driving the rod strips can be formed by a rod system which is preferably actuated by a single actuator.

BRIEF DESCRIPTION OF THE DRAWINGS

The invention will be explained in more detail on the basis of two exemplary embodiments, which will be described below with reference to the drawings, in which:

FIG. 1 is a perspective view of a first exemplary embodiment of the gripper in a position in which the gripper leaves are closed and the carrying strips are in a release position;

FIG. 2 shows the gripper of FIG. 1 in which the carrying strips are in the release position and the gripper leaves are in the open position;

FIG. 3 shows the gripper of FIGS. 1 and 2 in which the gripper leaves are in a closed position and the carrying strips are in the carrying position;

DESCRIPTION OF THE PREFERRED EMBODIMENTS

Figure 4:
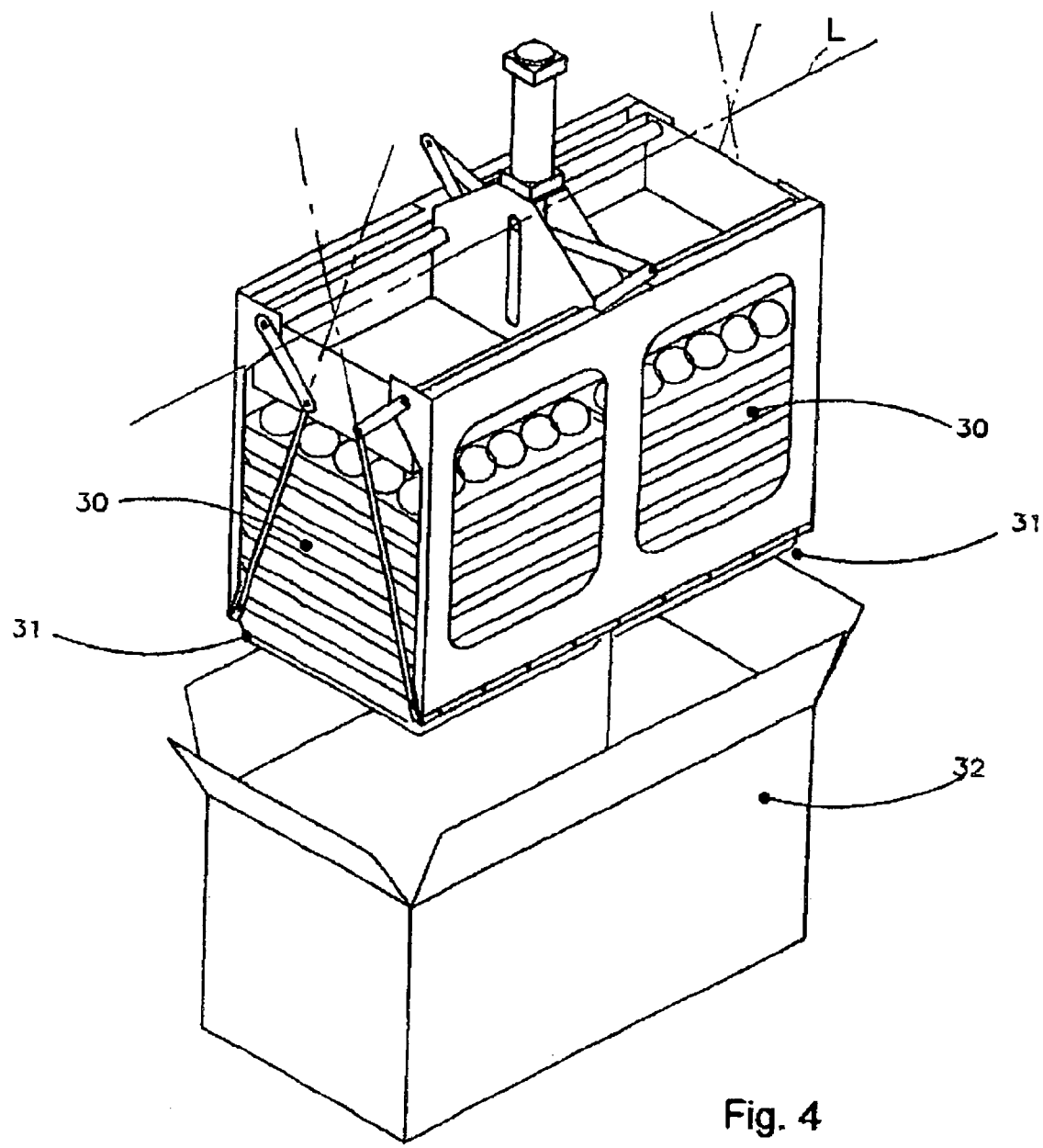
FIG. 4 shows the gripper of FIGS. 1–3 in the position shown in FIG. 3 in which it grips two stacks of trays.

The gripper is provided with a gripper frame 11, 12. Movably connected to this gripper frame 11, 12 are two, substantially flat, gripper leaves 21. In the present exemplary embodiment the gripper leaves 21 are hingedly connected to the gripper frame 11, 12 by an upper end. The gripper frame 11 in the present exemplary embodiment is designed as a sheet metal box with a gripper frame 12 being a housing centrally placed thereon for driving elements 23, 14, 15, 16. The gripper leaves are movable from an open position shown in FIG. 2 to a closed position shown in FIGS. 1, 3 and 4. Near a lower end of the gripper leaves 21 these gripper leaves 21 are each provided with a carrying strip 20 and 22, respectively. The carrying strips 20, 22 are hingedly connected to the gripper leaves 21 so as to be movable from a release position in which the carrying strip 20, 22 extends in the same plane as the associated gripper leaf 21 to a carrying position in which the carrying strip 20, 22 is substantially perpendicular to the gripper leaf 21 and is located between both gripper leaves 21. In the carrying position the carrying strips 20, 22 grip the lower end of a circumferential edge 31 of the lowermost tray of a stack 30. The gripper is further provided with control means 23, 14, 15, 16, 17, 18, 19 for controlling the gripper leaves 21 and the carrying strips 20, 22. The control means comprise four first rod strips 19 which are rotatably connected to the free ends of the carrying strips 20, 22 by a first end and to driving means 23, 15, 16, 17, 18 by another free end. In a closed position of the gripper leaves 21 and in the carrying position of the carrying strips 20, 22, the rod strips 19 extend from the carrying strips 20, 22 in the direction of imaginary line L which extends parallel to the gripper leaves 21 and is located centrally above a stack 30 of articles to be lifted by the gripper so that when carrying a stack of articles the rod strips 19 are tension loaded. For the purpose of bringing the carrying strips 20, 22 into the release position and the gripper leaves 21 into the open position, the rod strips 19 are pressure loaded by the driving means. The hinges of the gripper leaves 21 exert no leverage on the gripper leaves 21. The rotation of the gripper leaves 21 around the hinges is free and is only performed by the rod strips 19. These rod strips 19 are always located within the gripper leaves 21 so that for the purpose of bringing the gripper into a close-fitting box a minimum space is required.

The driving means 14–18, 23 comprise four second rod strips 18 which are hingedly connected to the rod strips 19 by a first end, and which are non-rotationally connected by a second end to a shaft 17, two of which are contained in the gripper. Non-rotationally mounted on each shaft 17 is a first control rod 16. Hingedly connected to the end of the first control rod 16 remote from the shaft 17 is a second control rod 15. Located at the free end of the second control rod 15 is a guide roller 14 which is arranged in a slot 13 of the gripper frame 12 for up and down movement. The position of the guide rollers 14 is controlled by a single actuator 23 which, in the present exemplary embodiment, is designed as a pneumatically actuated piston-cylinder assembly. The carrying strips 20, 22 are mounted on the gripper leaves 21 by means of a so-called piano hinge. At the upper end the gripper leaves 21 are suspended for free rotation on the above shafts 17 since the gripper leaves 21 have no pinching function. As for the first and second rod strips 19 and 18, respectively, the carrying strips 20, 22, and the gripper leaves 21, it is important that they are of slender design. The use of thin steel enables lowering of a stack of trays 30 into an overpack box 32 together with the gripper and subsequent removal thereof from the overpack box 32. As a result of the fact that in the present exemplary embodiment the carrying strips 20, 22 are connected to the gripper leaves 21 by means of a piano hinge, it is also ensured that the carrying strips 20, 22 are prevented from bending under the influence of the load. Indeed, piano hinges have a very high rigidity and strength when both hinge halves are at right angles to each another. Because the first rod strips 19 are tension loaded when carrying a stack of trays 30, they can be of very slender design. Only when the carrying strips 20, 22 have to be brought from the carrying position to the release position, the first rod strips 19 are pressure loaded. At that moment the first rod strips 19 are located tight between the overpack box 32 and the stack of egg trays 30 so that deformation is prevented.

Figure 5:
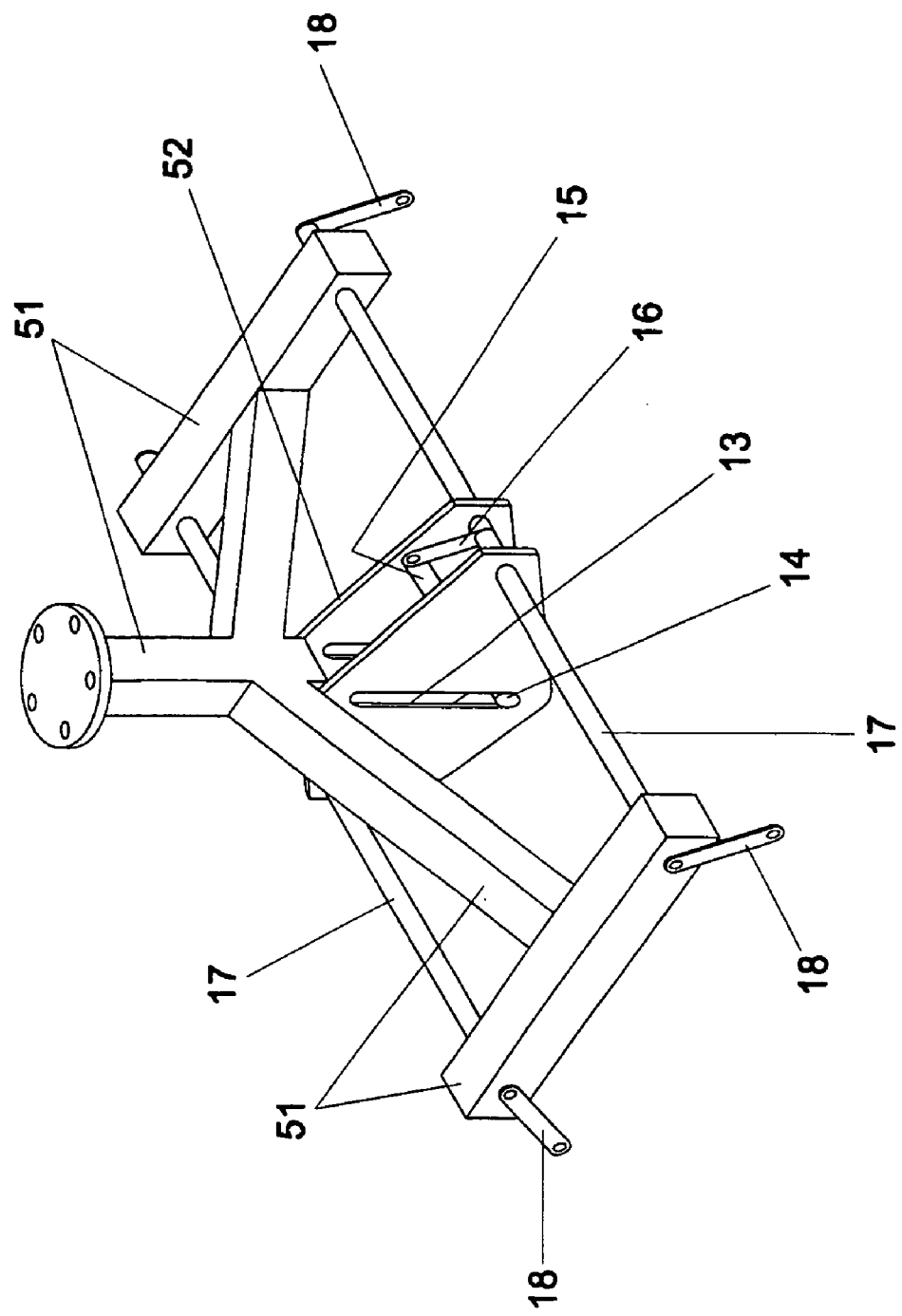
FIG. 5 shows an alternative embodiment of the gripper frame and the driving means.

FIG. 5 shows an alternative embodiment of the gripper frame. In this embodiment the box-like gripper frame 11 made of sheet steel is replaced by a frame 51 formed from tubes with a housing 52 being centrally located thereon.

It may be clear that the invention is not limited, but that different modifications are possible within the scope of the invention.

What is claimed is:

1. A gripper for lifting a stack of boxes, trays or such substantially rectangular articles, the gripper being provided with a gripper frame and two gripper leaves which are movably connected to the gripper frame so as to be movable from an open position to a closed position, the gripper leaves each being provided near a lower end thereof with a carrying strip, which carrying strip is hingedly connected to the gripper leaves at a first end so as to be movable from a release position in which the carrying strip extends in the same plane as the associated gripper leaf to a carrying position in which the carrying strip is substantially perpendicular to the gripper leaf and is located between both gripper leaves, the gripper being provided with control means for controlling the gripper leaves and the carrying strips, the gripper leaves being hingedly connected to the gripper frame by an upper end, wherein the gripper leaves are substantially flat and the control means comprises four first rod strips which are rotatably connected to the respective second ends of the carrying strips by a first end of the rod strips and to driving means by a second end of the rod strips, wherein when the gripper leaves are in the closed position and the carrying strips are in the carrying position, each of the rod strips extends from a respective one of the carrying strips in a direction which intersects an imaginary line which extends parallel to the gripper leaves and is located centrally above a stack of articles to be lifted by the gripper so that when carrying a stack of articles the rod strips are tension loaded.

2. A gripper according to claim 1, wherein for the purpose of bringing the carrying strips into the release position and the gripper leaves into the open position the rod strips are pressure loaded by the driving means.

3. A gripper according to claim 1, wherein the control means comprises a rod system which controls both the position of the carrying strips with respect to the gripper leaves and the position of the gripper leaves with respect to the gripper frame.

4. A gripper according to claim 1, wherein the control means comprises a single actuator.

* * * * *